United States Patent [19]
Wright et al.

[11] 3,882,111
[45] May 6, 1975

[54] 1,2-DIHYDRO-3-PHENOXYMETHYLPYRIDO[3,4-E]-AS-TRIAZINE HYDROCHLORIDE AND 3-PHENOXYMETHYLPYRIDO[3,4-E]-AS-TRIAZINE

[75] Inventors: George C. Wright; Allan V. Bayless; Joseph E. Gray, all of Norwich, N.Y.

[73] Assignee: Morton-Norwich Products, Inc., Norwich, N.Y.

[22] Filed: June 6, 1973

[21] Appl. No.: 367,497

[52] U.S. Cl. .......................... 260/248 AS; 424/249

[51] Int. Cl. ........................................... C07d 57/34
[58] Field of Search .............................. 260/248 AS

[56] References Cited
UNITED STATES PATENTS
3,597,427   8/1971   Lewis et al .......................... 260/248

*Primary Examiner*—John M. Ford
*Attorney, Agent, or Firm*—Anthony J. Franze

[57] ABSTRACT

The titled compounds are effective antifungal agents adapted to be combined in pharmaceutical forms for use in the eradication of fungus infection.

4 Claims, No Drawings

1,2-DIHYDRO-3-PHENOXYMETHYLPYRIDO[3,4-E]-AS-TRIAZINE HYDROCHLORIDE AND 3-PHENOXYMETHYLPYRIDO[3,4-E]-AS-TRIAZINE

This invention is concerned with the chemical compounds 1,2-dihydro-3-phenoxymethylpyrido[3,4-e]-as-triazine hydrochloride and 3-phenoxymethylpyrido[3,4-e]-as-triazine. These compounds are effective antifungal agents. They are readily prepared in accordance with the following examples:

EXAMPLE I

1,2-Dihydro-3-phenoxymethylpyrido[3,4-e]-as-triazine Hydrochloride

A. Ethyl 3-(3-nitro-4-pyridyl)carbazate Hydrochloride

To a solution of 91 g (0.57 mole) of 4-chloro-3-nitropyridine in 600 ml of phenol was added 62 g (0.60 mole) of ethyl carbazate at 40°–50°, using mechanical stirring. The reaction was exothermic over ca. 5 min, with a temperature rise to 72°. The reaction solution was heated on the steam bath for 1¾ hr, cooled to 35°–40°, and added to 3.2 l of anhydrous ether. After standing at room temperature for ca. 10 min, the supernatant solution was decanted, and the resultant amorphous solid was washed twice with anhydrous ether. The solid was treated with 500 ml of isopropanol, heating on the steam bath with trituration, affording a light yellow, crystalline solid. Upon cooling in an ice bath for ca. 10 min, the intitial product was collected, washed well with isopropanol and ether, and dried in a vacuum dessicator overnight. Yield: 55 g (37%). The product was recrystallized from 700 ml of ethanol, m.p. 203°–204°. Yield: 40 g.

Anal. Calcd. for $C_8H_{10}N_4O_4.HCl$: C, 36.58; H, 4.22; N, 21.33.
Found: C, 36.70; H, 4.22; N, 21.65.

B. 4-Hydrazino-3-nitropyridine Hydrochloride

A solution of 87 g (0.33 mole) of A. in 520 ml of concentrated HCl was heated to dryness over 23 hr on a steam bath. The yellow residue was slurried in 200 ml of ethanol refluxed for 20 min, and filtered hot. The red crystalline solid was washed with 100 ml of isopropanol, 200 ml. of ether, and dried, m.p. 219°–221° dec. Yield: 39 g (56%).

The crude product was recrystallized (Darco) from 1050 ml of methanol, washed with five 20-ml portions of methanol, 240 ml of ether, and dried; m.p. 225°–227° dec. Yield: 24 g (38%).

Anal. Calcd. for $C_5H_6N_4O_2.HCl$: C, 31.51; H, 3.70; N, 29.40; Cl, 18.60
Found: C, 31.60; H, 3.80; N, 29.66; Cl, 18.50

C. 3-Amino-4-hydrazinopyridine Hydrochloride

A 22 g (0.12 mole) portion of B. was slurried in 170 ml of ethanol, treated with 1.4 g of 5% Pd/C (50% moisture) and subjected to hydrogenation at 50 psig. The hydrogen uptake was 30 lb. in 4 hr. The reduction mixture was cooled for 2 hr and filtered. The product plus catalyst was washed with three 10 ml portions of isopropanol, ether and dried, m.p. 217°–218° decompn. Yield: 17 g (92%).

This procedure was repeated once more to give a total of 34 g of the product plus catalyst. The crude product, 34 g, was recrystallized from 1.7 l of methanol:$H_2O$ (19:1), washed with 170 ml of methanol, 300 ml of ether and dried, m.p. 223°–225° decompn. Yield: 23 g (61%).

Anal. Calcd. for $C_5H_8N_4.HCl$: C, 37.39; H, 5.65; N, 34.89.
Found: C, 37.12; H, 5.58; N, 34.72.

D. 1,2-Dihydro-3-phenoxymethylpyrido[3,4-e]-as-triazine Hydrochloride

A mixture of 35.4 g (.22 mole) of C. and 61 g (.40 mole) of phenoxyacetic acid was heated with stirring for 1¼ hrs in a 135° oil bath. The reaction was cooled, and dissolved in 500 ml of water. The water solution was washed with 3×250 ml of chloroform and flash-evaporated to dryness.

The residue was dissolved in 250 ml of abs. MeOH and 50 ml of HCl-saturated MeOH was added. The reaction was refluxed overnight, cooled to room temperature, and a gray material was filtered. Crystals formed in the filtrate and were filtered. Yield: 23 g (38%), m.p. 192°–195° (dec.).

Anal. Calcd. for $C_{13}H_{12}N_4O.HCl$: C, 56.42; H, 4.74; N, 20.25.
Found: C, 56.43; H, 4.70; N, 20.37.

EXAMPLE II

3-Phenoxymethylpyrido[3,4-e]-as-triazine

To a solution of 15 g of the compound of Example I in 150 ml of $H_2O$ was added 45 g of $MnO_2$. The reaction was stirred for ¾ hr and then filtered. The residue was washed with 50 ml of EtOH and then with ½ liter of $HCCl_3$. The $HCCl_3$ layer was washed with 200 ml of water, filtered through anhyd. $MgSO_4$ and flash-evaporated to dryness to yield an orange solid. This was recrystallized from 400 ml of abs. MeOH to give 10.5 g, (81%), m.p. 115°–119°.

Anal. Calcd. for $C_{13}H_{10}N_4O$: C, 65.53; H, 4.23; N, 23.52.
Found: C, 65.60; H, 3.95; N, 23.60.

The compounds of this invention are potent antifungal agents. They are capable in small concentrations of inhibiting the growth of pathogenic fungi such as *Candida albicans* and *Microsporum canis*. Such capabilities are represented in the table herebelow which reflects results secured in the commonly used in vitro antifungal test employing Sabouraud's dextrose agar as the medium supportive of fungal growth and measuring the amount of inhibition of such growth in millimeters over a period of 8 days:

| Compound | *Conc. in mcg/ml | Diameter of Zone of Inhibition in mm at Days | | | | | | |
|---|---|---|---|---|---|---|---|---|
| | | C. albicans | | | | M. canis | | |
| | | 2 | 4 | 6 | 8 | 4 | 6 | 8 |
| Example I | 1480 | 26 | 25 | 25 | 24 | 60 | 59 | 59 |
| Example II | 980 | 24 | 18 | 16 | 15 | 45 | 40 | 35 |

*The diluent carrier for the compound in this test is 50% ethanol which exhibits no antifungal activity.

A noteworthy characteristic of the compounds of this invention is their lack of irritation to the skin. When applied daily in the form of a suspension at concentrations up to 4% in a vehicle of aqueous methyl cellulose, no skin irritation was observed over a period of three days.

For convenience in administration the compounds of this invention can be compounded in various pharmaceutical forms such as ungents, solutions, suspension, powders, and sprays using readily available and commonly used excipients with which there is no incompatibility.

What is claimed is:

1. A compound selected from the group consisting of 1,2-dihydro-3-phenoxymethylpyrido[3,4-e]-as-triazine hydrochloride and 3-phenoxymethylpyrido[3,4-e]-as-triazine.

2. The compound 1,2-dihydro-3-phenoxymethylpyrido[3,4-e]-as-triazine hydrochloride.

3. The compound 3-phenoxymethylpyrido[3,4-e]-as-triazine.

4. The method of preparing 3-phenoxymethylpyrido[3,4-e]-as-triazine which consists in oxidizing 1,2-dihydro-3-phenoxymethylpyrido[3,4-e]-as-triazine hydrochloride with manganese dioxide.

* * * * *